(12) United States Patent
Zyazin

(10) Patent No.: US 10,185,041 B2
(45) Date of Patent: Jan. 22, 2019

(54) RADIATION DETECTOR AND A METHOD THEREOF

(71) Applicant: TELEDYNE DALSA B.V., Eindhoven (NL)

(72) Inventor: Alexander Zyazin, Eindhoven (NL)

(73) Assignee: Teledyne Dalsa B.V., Eindhoven (NL)

( * ) Notice: Subject to any disclaimer, the term of this patent is extended or adjusted under 35 U.S.C. 154(b) by 0 days.

(21) Appl. No.: 15/526,646

(22) PCT Filed: Feb. 5, 2015

(86) PCT No.: PCT/EP2015/052432
§ 371 (c)(1),
(2) Date: May 12, 2017

(87) PCT Pub. No.: WO2016/124244
PCT Pub. Date: Aug. 11, 2016

(65) Prior Publication Data
US 2017/0307767 A1    Oct. 26, 2017

(51) Int. Cl.
*G01T 1/20* (2006.01)
*B82B 1/00* (2006.01)

(52) U.S. Cl.
CPC .......... *G01T 1/2018* (2013.01); *B82B 1/005* (2013.01); *B82B 1/007* (2013.01); *G01T 1/2002* (2013.01)

(58) Field of Classification Search
CPC ............................. G01T 1/2018; B82B 1/005
See application file for complete search history.

(56) References Cited

U.S. PATENT DOCUMENTS

| 6,393,092 B1 | 5/2002 | Yoshisa et al. |
| 7,233,640 B2 | 6/2007 | Ikhlef et al. |

(Continued)

FOREIGN PATENT DOCUMENTS

EP    0921414 A1    6/1999

OTHER PUBLICATIONS

"Smart Fiber Optics for use in modern Radiology" (2013), p. 1-3 available at: https://www.schott.com/magazine/english/sol213/sol213_10_faceplates.html.*

(Continued)

*Primary Examiner* — Kenneth J Malkowski
(74) *Attorney, Agent, or Firm* — K&L Gates LLP

(57) ABSTRACT

The radiation detector (10) comprises a scintillator (15) having a first refractive index ($n_s$) for converting incident radiation (RR) received at a first side (S1) of the radiation detector (10) into converted radiation (CR), a photosensor (20) for receiving the converted radiation (CR) from the scintillator (15), and an optical coating layer (25) arranged between the scintillator (15) and the photosensor (20). The scintillator (15) has regions (RR) arranged for being imaged, when impinged by the incident radiation (RR), onto corresponding regions of the photosensor (20). The optical coating layer (25) has a second refractive index ($n_o$) lower than the first refractive index ($n_s$) for reflecting the converted radiation (CR) resulting from the incident radiation (RR) impinged on a particular region (A1) of the scintillator (15) and received by a region (A3) of the optical coating layer (25) corresponding to a photosensor region different from the imaged one (A2).

4 Claims, 3 Drawing Sheets

(56) References Cited

U.S. PATENT DOCUMENTS

| | | | |
|---|---|---|---|
| 2005/0023472 A1* | 2/2005 | Wei | G01T 1/2002 250/368 |
| 2012/0228512 A1* | 9/2012 | Tang | G01T 1/2018 250/368 |
| 2012/0248318 A1 | 10/2012 | Ito et al. | |
| 2013/0134312 A1 | 5/2013 | Nnano et al. | |
| 2014/0239196 A1 | 8/2014 | Shoji et al. | |

OTHER PUBLICATIONS

International Search Report for International Application No. PCT/EP2015/052432, dated Oct. 30, 2015.
Written Opinion of the International Searching Authority for International Application No. PCT/EP2015/052432, dated Oct. 30, 2015.
Yamaguchi et al., "Ultralow refractive index coatings consisting of mesoporous silica nanoparticles", Optics Letters, Optical Society of America, US, vol. 34, No. 13, Jul. 1, 2009, pp. 2060-2062.

* cited by examiner

RADIATION DETECTOR AND A METHOD THEREOF

CROSS-REFERENCE TO RELATED APPLICATION

This application is a U.S. National Stage Entry under 35 U.S.C. § 371 of International Patent Application No. PCT/EP2015/052432, entitled A RADIATION DETECTOR AND A METHOD THEREOF, filed Feb. 5, 2015, the entire disclosure of which is hereby incorporated by reference herein.

FIELD OF THE INVENTION

The invention relates to a radiation detector, a flat panel detector, a radiological instrument and a method of fabricating the radiation detector.

BACKGROUND ART

Radiation detectors are devices capable of detecting incident radiation. In medicine, radiation detectors for X-ray images have applications for the diagnosis of a patient's condition. The radiation detectors for X-ray images are typically integrated in radiological instruments that utilize computer-processed X-ray images to produce images of specific regions of a patient's body. These images may be planar images, panoramic images or so-called tomographic images. Planar images are typically obtained by flat panel radiation detectors. Panoramic images may be obtained by a sequence of planar images taken one after another. Tomographic images may instead be obtained by a three-dimensional reconstruction of the specific regions of the patient's body. The radiological instruments may be intra-oral radiologic dental imagers, dental imagers, mammography systems, computed tomography scanners (CT-scanner), computed axial tomography scanners (CAT-scanners), mobile C-arm, etc. Indirect conversion radiation detectors for X-ray images may consist of a radiation converter element (e.g. a scintillator) that absorbs and converts the incident radiation (i.e. X-rays) into converted radiation with longer wavelength (e.g. visible light). The converted radiation with longer wavelength reaches a photo sensitive element, e.g. a CMOS photosensor, a CCD image sensor, etc. The photo sensitive element may be coupled to an electronic system that generates electrical signals corresponding to a radiation pattern of the incident radiation absorbed by the radiation converter element. Data embodied in such electrical signals may be shown in a visual display or sent to a computer for further analysis of the radiation pattern.

The converted radiation generated in the radiation converter element has a wide angular distribution, e.g. the radiation may be isotropically generated. As a consequence the converted radiation originated at one originating region of the radiation converter element in response to the incident radiation may be transmitted through the radiation converter element to a region of the photosensor far away from the originating region of the radiation converter element. This results in an undesired effect which is sometimes called in the art crosstalk or optical light spreading and may result in blurred X-ray images or X-ray images with less spatial resolution. Several solutions exist to prevent or limit crosstalk in radiation detectors.

For example US 2005/0111612 A1 discloses a Computed Tomography detector. The Computed Tomography detector (CT) includes a plurality of scintillators separated by gaps filled with reflectors, a photodiode array arranged below the plurality of scintillators and an optical layer mask comprising optical mask elements arranged between the plurality of scintillators and the photodiode array. The optical mask layer absorbs light and is designed to reduce lateral crosstalk from a scintillator and the photodiode of a neighboring scintillator.

The optical mask layer may contain optical reflective elements (or angled reflective elements) to reduce the lateral cross-talk between neighboring photodiodes.

However, reduction of the lateral cross-talk is limited to cross-talk between neighboring photodiode/scintillators cells. Further, reflectors between neighboring scintillators are required to reflect light converted in a scintillator cell that, without reflectors, would directly impinge via the gap on a neighboring photodiode. The latter situation could for example arise for large spreading of the converted light.

SUMMARY OF THE INVENTION

One of the objects of the invention is to provide a radiation detector with reduced crosstalk to prevent spreading of the converted light.

According to the invention, this object is achieved by a radiation detector as claimed in claim 1. The radiation detector detects incident radiation at a first side of the radiation detector. The radiation detector includes a scintillator, a photosensor and an optical coating layer. The scintillator converts the incident radiation (typically X-ray) into converted radiation (typically visible light). The photosensor receives the converted radiation from the scintillator. The optical coating layer is arranged between the scintillator and the photosensor. The scintillator has a first refractive index. The optical coating layer has a second refractive index lower than the first refractive index. Regions of the scintillator on which the incident radiation impinges are arranged for being imaged, when impinged by the incident radiation, onto corresponding regions of the photosensor. The optical coating layer internally reflects a portion of the converted radiation resulting from the incident radiation impinging on a particular region of the scintillator. This portion of the converted radiation is received by a region of the optical coating layer at an offset from the corresponding region of the photosensor onto which the particular region of the scintillator is intended to be imaged.

The converted radiation impinges on the optical coating layer with an angle of incidence with respect to an axis perpendicular to the optical coating layer.

A critical angle of incidence depending solely on the ratio of the second refractive index to first refractive index can be found.

Converted radiation impinging with angle lower than the critical angle of incidence is refracted and transmitted through the optical coating layer. The region of the optical coating layer delimited by angles of incidence lower than the critical angle, corresponds to or overlaps the region of photosensor onto which the region of the scintillator, impinged by the incident radiation, is intended to be imaged. The optical coating layer totally internally reflects converted radiation impinging on the optical coating layer with angle higher than the critical angle of incidence. This region of the optical coating layer is located outside the intended region, i.e. at an offset from the region of photosensor onto which the impinged region of the scintillator is intended to be imaged. The offset is larger for larger critical angle of incidences.

In an embodiment, the photosensor may comprise one or more layers having respective refractive indexes. The photosensor may be part of the optical stack comprising the scintillator, the photosensor and the optical coating layer. The second refractive index may be lower than the respective refractive indexes. Since the second refractive index is the lowest index in the optical stack and the converted radiation is transmitted through the one or more layers of the photosensor after being transmitted through the scintillator-optical coating layer interface, the critical angle of incidence still depends solely on the ratio of the second refractive index to first refractive index. As a consequence, the optical coating layer still totally internally reflects converted radiation impinging on the optical coating layer with an angle higher than the critical angle of incidence.

For a lower second refractive index, the critical angle of incidence decreases, meaning that the lateral cross talk is further reduced.

The second refractive index may be substantially lower than 1.25. For example, the optical coating layer 25 may be made of nano-porous material. The nano-porous material may comprise mesoporous silica nanoparticles or porous silica particles or a (meso)porous silicon (di)oxide nanoparticles film. Films of mesoporous silica nanoparticles have been reported having a refractive index of 1.12.

The present invention further provides a flat panel detector, a radiological instrument and a method of fabricating a radiation detector as described in the accompanying claims.

These and other aspects of the invention will be apparent from and elucidated with reference to the embodiment described hereinafter.

BRIEF DESCRIPTION OF THE DRAWINGS

These and other aspects of the invention are apparent from and will be elucidated with reference to the embodiments described hereinafter. In the drawings.

It should be noted that items, which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
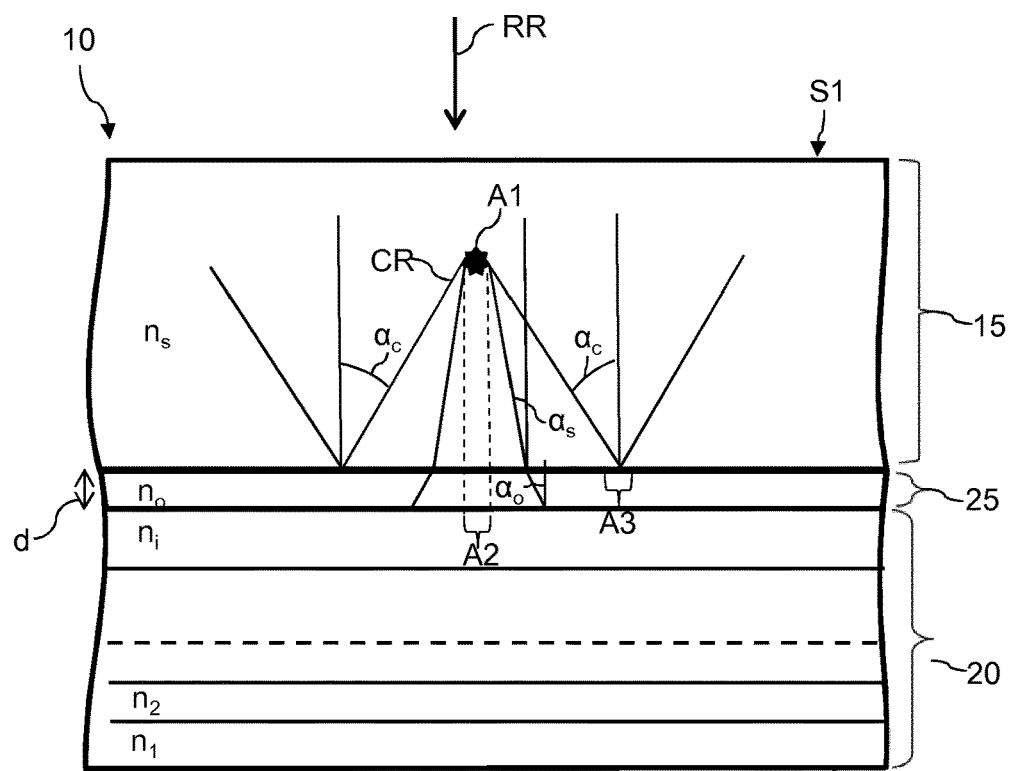
FIG. 1 shows a cross section of a first example of a radiation detector.

FIG. 1 shows a cross section of a first example of a radiation detector 10. The radiation detector 10 of FIG. 1 detects incident radiation RR at a first side S1 of the radiation detector 10. The radiation detector 10 comprises a scintillator 15 for converting the incident radiation RR into converted radiation CR. The scintillator 15 has a first refractive index $n_s$. The radiation detector 10 comprises a photosensor 20 for receiving the converted radiation CR from the scintillator 15. The radiation detector 10 further comprises an optical coating layer 25 arranged between the scintillator 15 and the photosensor 20. The optical coating layer 25 has a second refractive index $n_o$. The second refractive index $n_o$ is lower than the first refractive index $n_s$. The photosensor 20 is separated from the scintillator 15 by the optical coating layer 25.

Regions of the scintillator 15 on which the incident radiation RR are arranged for being imaged onto corresponding regions of the photosensor 20. For example, as shown in FIG. 1, the incident radiation RR may impinge on a particular region A1 of the scintillator 15. At the region A1, the incident radiation RR is converted into converted radiation CR. The converted radiation CR scatters from the region A1 in all directions inside the scintillator 15. However, the converted radiation CR is intended to be imaged onto a corresponding region A2 of the photosensor 20. The corresponding region A2 is displaced with respect to the region A1 in a direction of the incident radiation RR. The region A1 and the corresponding imaged region A2 may be arranged in parallel with a flat or almost flat surface of the scintillator 15. The region A1 and the corresponding imaged region A2 are displaced in a direction perpendicular to said flat or almost surface.

When the converted radiation CR impinges on the optical coating layer 25 with a first angle of incidence $\alpha_s$, the converted radiation CR is transmitted through the optical coating layer 25, and impinges on the photosensor 20 with a second angle of incidence $\alpha_o$. Provided that geometrical optics approximations, for which the Snell's law is valid, are satisfied, the following relation holds:

$$n_s \sin \alpha_s = n_o \sin \alpha_o \quad (1).$$

A critical angle of incidence $\alpha_c$ can be determined by using the relation (1) and by imposing that the second angle of incidence $\alpha_o$ is 90°, in which case there is no converted radiation CR transmitted through the optical coating layer 25, i.e.:

$$\sin \alpha_o = \frac{n_s}{n_o} \sin \alpha_c = 1, \quad (2)$$

and $$\alpha_c = \arcsin\left(\frac{n_o}{n_s}\right). \quad (3)$$

When the converted radiation CR at the region A1 is received by a region of the optical coating layer 25 located at an offset from the location of said corresponding region A2, the angle of incidence $\alpha_s$ of the converted radiation CR with the optical coating layer 25 may be smaller or larger than the critical angle of incidence $\alpha_c$.

When the angle of incidence $\alpha_s$ is smaller than the critical angle of incidence $\alpha_c$, the converted radiation CR is transmitted through the optical coating layer 25. When the converted radiation CR impinges on the optical coating layer 25 with a first angle of incidence $\alpha_s$ larger than a critical angle of incidence $\alpha_c$, the converted radiation CR is said to be totally internally reflected by the optical coating layer 25.

In other words, when the converted radiation CR at the region A1 is received by the optical coating layer 25 at a region extending from the corresponding imaged region A2 to the region A3, the converted radiation CR is refracted and transmitted through the optical coating layer 25. When the converted radiation CR at the region A1 is received by the optical coating layer 25 at a region extending further away from the region A3 of the optical coating layer 25, the converted radiation CR is totally internally reflected by the optical coating layer 25. Thus radiographic images obtained with the radiation detector 10 have an enhanced spatial resolution. In fact in this situation the radiation detector 10 has an enhanced Modulation Transfer Function (MTF) and Detective Quantum Efficiency (DQE). The Modulation Transfer Function is in the art a widely accepted spatial resolution performance metric. The Detective Quantum Efficiency is in the art a widely accepted Figure Of Merit (FOM) for radiation detectors. The Detective Quantum Efficiency represents a noise figure measure of the radiation detector 10, i.e. a square of a ratio between the signal to noise ratio at an input of the radiation detector 10, e.g. wherein the incident radiation RR impinges on the scintillator 15, and the signal to noise ratio at an output of the radiation detector 10, e.g. wherein the converted radiation CR is received by the photosensor 20. The MTF and DQE may be expressed as a function of the frequency, notably as the spatial frequency, or as a function of two-dimensional spatial frequency vector or as a function of two orthogonal spatial frequencies.

The optical coating layer 25 totally internally reflects a portion of the converted radiation CR resulting from the incident radiation RR that impinges on a particular region A1 of the scintillator 15. This portion of the converted radiation CR is received by another region A3 of the optical coating layer 25 whose location is defined by the critical angle of incidence $\alpha_c$. Lateral optical crosstalk caused by the portion of the converted radiation CR laterally spreading from the particular region A1 of the scintillator 15 is thus also reduced. The Modulation Transfer Function and the Detective Quantum Efficiency of the radiation detector 10 may be thereby enhanced. The effect is the strongest at high spatial frequencies.

The radiation detector 10 may include a plurality of layers with respective refractive indices. For example, as shown in FIG. 1, the photosensor 20 may comprise one or more layers having respective refractive indexes $n_1$, $n_2$, $n_i$. The second refractive index $n_o$ may be lower than the respective indices $n_1$, $n_2$, $n_i$ and the first refractive index $n_s$. The layers of the photosensor 20 may be part of an optical stack comprising the scintillator 15, the optical coating layer 25 and the photsensor 20. The optical coating layer 25 has the lowest refractive index in the optical stack. The first refractive index $n_s$ may be the highest refractive index of the optical stack. Alternatively, one of the layers of the photosensor 20 may have the highest refractive index of the optical stack. In either cases, since the optical coating layer 25 has the lowest refractive index in the optical stack and the interface scintillator 15—optical coating layer 25 precedes the photosensor 20 in the optical stack, the critical angle of incidence $\alpha_c$ is determined by the relation (3). Reflection is thus occurring in a region of the radiation detector 10 adjacent to the scintillator 15 where the converted radiation CR originated. This ensures that the converted radiation CR is not further spreading by refractions in lower layers of the optical stack before reaching e.g. a plurality of photo diodes at the bottom of the photosensor 20.

The radiation detector 10 shown in FIG. 1 is a Penetration Side Sampling (PSS) detector. The scintillator 15 is located at the first side S1, i.e. at the side of the incident radiation RR.

However, the radiation detector may be implemented in any manner suitable for the specific implementation.

Figure 2:
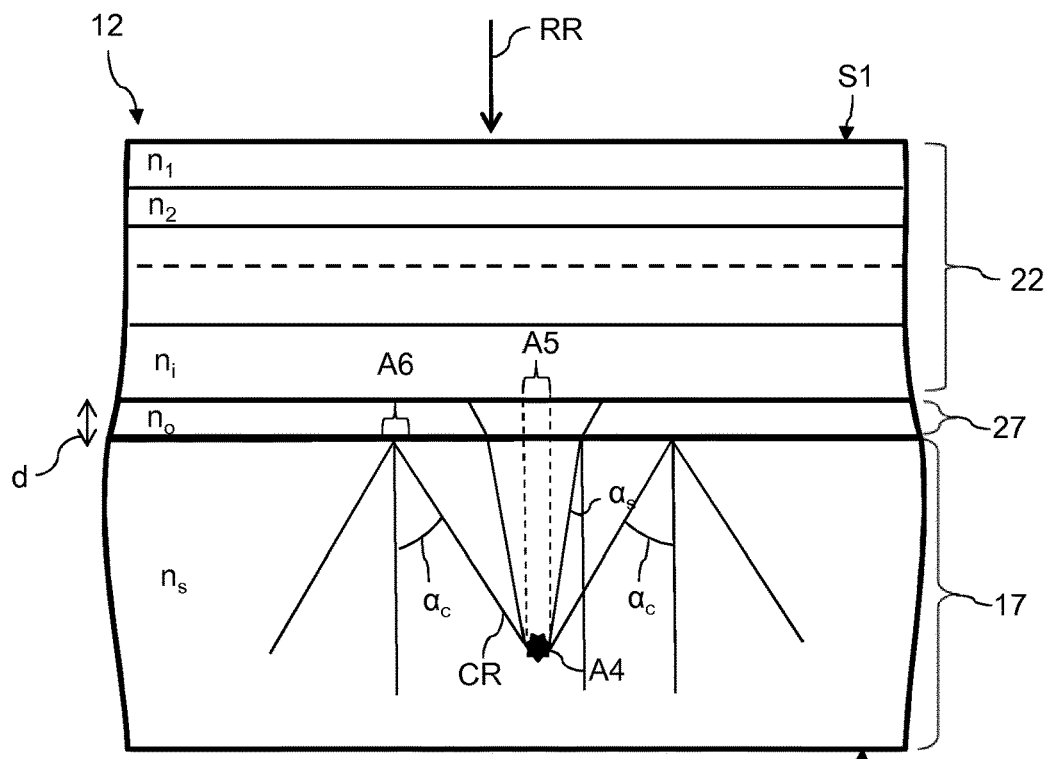
FIG. 2 shows a cross section of a second example of a radiation detector.

For example, referring to FIG. 2, a cross section of a second example of a radiation detector 12 is shown. The radiation detector 12 is an Incident Side Sampling (ISS) detector. The radiation detector 12 comprises a scintillator 17, a photosensor 22 and an optical coating layer 27. The photosensor 22 is located at the first side S1, i.e. at the side of the incident radiation RR. The scintillator 17 is located at a side opposite to first side S1. The optical coating layer 27 is arranged between the photosensor 22 and the scintillator 17. As described with reference to FIG. 1, the scintillator 17 has a first refractive index $n_s$, the optical coating layer 27 has a second refractive index $n_o$, the photosensor 22 may have a plurality of layers with respective refractive indexes $n_1$, $n_2$, $n_i$. The second refractive index $n_o$ is lower than the first refractive index $n_s$ and the respective refractive indexes $n_1$, $n_2$, $n_i$. The second refractive index $n_o$ is the lowest refractive index of the optical stack. The first refractive index $n_s$ may be the highest refractive index of the optical stack.

The optical coating layer 27 is substantially transparent to the incident radiation RR. The photosensor 22 may be also transparent to the incident radiation RR. The incident radiation RR thus penetrates the photosensor 22, the optical coating layers 27, and reaches the scintillator 17 where it is converted in converted radiation CR. Optionally a reflector can be arranged at the second side S2 to direct the converted radiation CR penetrating through the scintillator 17 back towards the first side S1. The converted radiation CR impinging on the optical coating layer 27 with an angle of incidence $\alpha_s$ larger than the critical angle of incidence $\alpha_c$ is totally internally reflected. The effect explained with reference to the example shown in FIG. 1 holds for the example shown in FIG. 2, where the regions A1, A2 and A3 of FIG. 1 are equivalent to the respective regions A4, A5 and A6 shown in FIG. 2.

The optical coating layer 25 or 27 may be made of any material suitable for the specific implementation.

For example, the optical coating layer 25 or 27 may be made of nano-porous material. The nano-porous material may comprise mesoporous silica nanoparticles or porous silica particles or a (meso)porous silica, or a silicon (di) oxide nanoparticles film. The optical coating layer 25 may comprise in addition to nano-porous material a binder that may be mixed with the nano-porous material, for increasing a mechanical hardness of the nano-porous material. Alternatively, a protective layer made for example of TEOS (Tetraethyl orthosilicate), may be applied on top of the optical coating layer. The optical coating layer 25 or 27 may have a second refractive index $n_o$ substantially smaller than 1.25. For example, films of mesoporous silica nanoparticles have been reported having a refractive index of 1.12. By introducing an optical coating layer 25 having the second refractive index $n_o$ substantially smaller than 1.25, the critical angle of incidence $\alpha_c$ may be kept relatively small. With a relatively small critical angle of incidence $\alpha_c$, less converted radiation CR will spread away from the corresponding region A2, thereby resulting in a reduction of the lateral crosstalk. The region A3 or A6 can be closer to the region A2 or A5.

The optical coating layer 25 or 27 may have any suitable thickness d. The thickness d may e.g. be in a range between 100 nm to 1000 nm. Films of nano-porous material, e.g. mesoporous silica nanoparticles, may have a thickness of as low as 100 nm. A low thickness of the optical coating layer 25 contributes to less lateral spreading of the converted radiation CR. In fact refraction through the optical coating layer 25 is limited through the relatively thin layer.

However, the thickness d may be higher 100 nm, for example 500 nm or higher. Depending on the optical stack, the thickness d may be tuned to enhance transmission through the optical stack.

The scintillator 15 may be implemented in any manner.

For example, the scintillator 15 may be a columnar scintillator. The scintillator 15 may be a Thallium doped Caesium Iodide (CsI:Tl) columnar scintillator. CsI:Tl scintillators are capable of absorbing radiation in the X-ray range with high efficiency, partly preventing that the incident radiation RR hits the photosensor 20. CsI:Tl scintillators have a so called high X-ray stopping power. Further to that, CsI:Tl scintillators convert the incident radiation RR into the converted radiation CR with high efficiency, i.e. CsI:Tl scintillators have a high conversion efficiency. For example, a CsI:Tl columnar scintillator may consist of an arrangement of crystal columns of average diameters as small as a few microns. The crystal columns of columnar scintillator are spatially separated such that the converted radiation CR is confined in the crystal columns. The crystal columns may act as waveguides for the converted radiation CR. The converted radiation CR may propagate within the crystal columns so that lateral spreading of the converted radiation CR is prevented and conversion efficiency of the scintillator is enhanced.

Alternatively, the scintillator 15 may be made of another compound or may be a non-columnar scintillator. For example, the scintillator 15 may be made of cubic crystals of a suitable scintillator compound grown on a substrate in a direction perpendicular or at a small angle to a surface of the substrate. Alternatively granular deposition may be used to fabricate the non-columnar scintillator. Ceramic scintillators like, e.g. terbium doped gadolinium oxysulfide ($Gd_2O_2S$:Tb) scintillators, can be also used.

The scintillator 15 may be arranged to convert the incident radiation RR into converted radiation CR within a predetermined wavelength emission range. The predetermined wavelength emission range may comprise a peak emission wavelength wherein the incident radiation RR is converted with a maximum conversion rate within the predetermined wavelength emission range.

For example, in case of Thallium doped Caesium Iodide scintillators, the predetermined emission wavelength range is in a range between 400 nm and 800 nm with a peak emission wavelength of 550 nm.

The thickness d of the optical coating layer 25 may be substantially equivalent or slightly thinner or thicker than the peak emission wavelength. The thickness d may be determined by experiments or by simulations taking into account the whole optical stack. An optimal thickness can be found for example as the thickness enhancing transmission of the light falling perpendicularly to the surface of the optical coating layer 25. However, other optimization criteria might be also thought of, for example an optimal thickness may be found to enhance transmission for all the incident angles in a specified range.

The photosensor 20 may also have a specific sensitivity wavelength band, i.e. a wavelength range within which the photosensor 20 is able to receive the converted radiation CR with high sensitivity and convert the converted radiation CR into electrical signals. The desired wavelength range within which the optical coating layer 25 transmits a portion of the converted radiation CR to the photosensor 20 and outside which the optical coating layer 25 reflects or absorbs the converted radiation CR, may be within the emission wavelength range of the scintillator 15 and the specific sensitivity wavelength band of the photosensor 20.

Referring to the embodiment described with reference to FIG. 1 and FIG. 2, an adhesive layer (not shown in the FIGS. 1 and 2) may be placed between e.g. the photosensor 20 and the optical coating layer 25. The adhesive layer may be thus used to attach the photosensor 20 to the stack optical coating layer 25—scintillator 15.

Alternatively, the adhesive layer may be placed between the scintillator 15 and the optical coating layer 25. In the latter case, the adhesive layer may be used to attach the photosensor 20 to the stack optical coating layer 25—scintillator 15.

The adhesive layer causes additional lateral spread of the converted radiation CR, especially for relatively thick adhesives. The optical coating layer 25 reduces the sensitivity of the lateral spreading of the converted radiation CR to the thickness of the adhesive layer.

Figure 3:
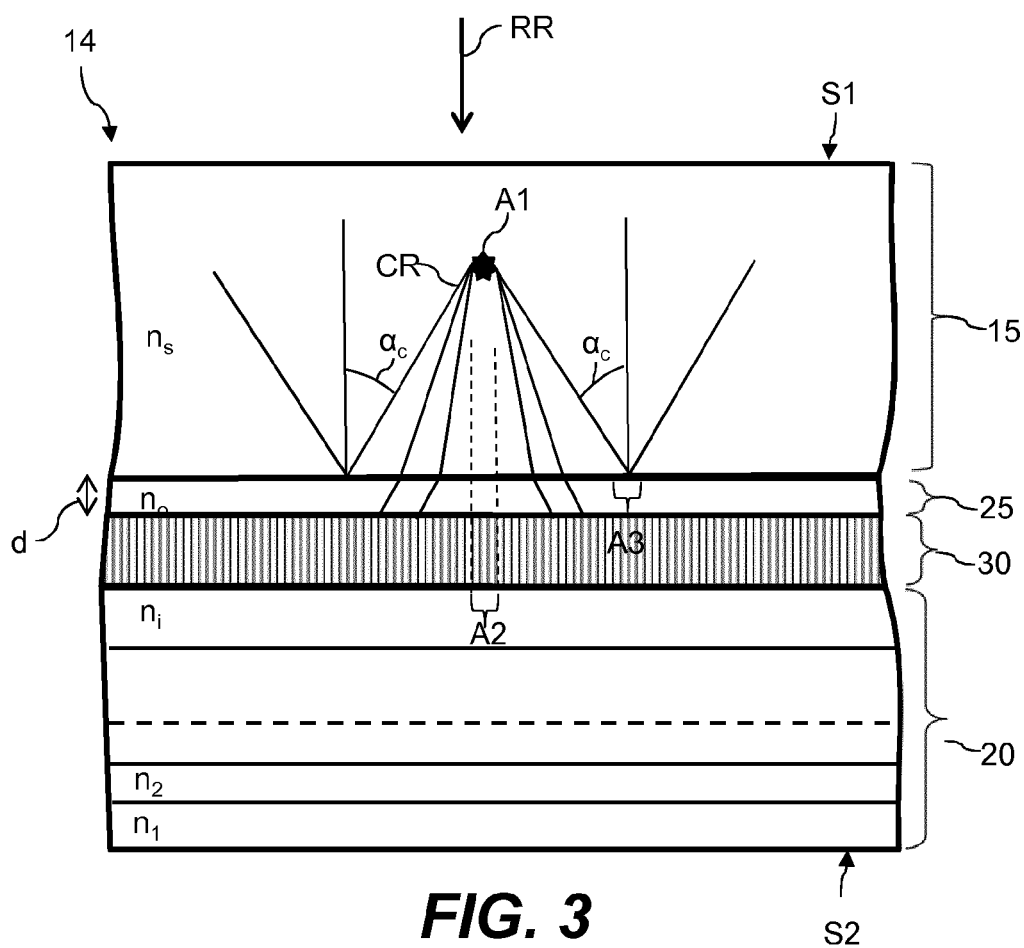
FIG. 3 shows a cross section of third example of a radiation detector

FIG. 3 shows a cross section of a third example of a radiation detector 14. The radiation detector 14 differs from the radiation detector 10 shown in FIG. 1 in that the radiation detector 14 further comprises an optical layer 30 arranged between the scintillator 15 and the optical coating layer 25 for protecting the photosensor 20 against the incident radiation RR.

Alternatively, the optical layer 30 may be arranged between the optical coating layer 25 and the photosensor 20, which is an option not shown in FIG. 3. The optical layer 30 optically couples the optical coating layer 25 to the scintillator 15 or the optical coating layer 25 to the photosensor 20. The optical layer 30 may be a fiber optical plate arranged between the photosensor 20 and the scintillator 15. The radiation detector 14 may receive a high dose of incident radiation RR during its lifetime. The radiation detector 14 should withstand said high dose of incident radiation RR. The optical layer 30 may be used to protect the photosensor 20 from the portion of the high dose of incident radiation RR that is not stopped by the scintillator 15. Further, the optical layer 35 may prevent the incident radiation RR to interact with a substrate of the photosensor 20, e.g. a silicon substrate, thereby generating charge carriers, e.g. electrons or holes, which would produce an undesired blurred or scattered response of the photosensor 20.

Referring to the embodiment described with reference to FIG. 3, the adhesive layer (not shown in the FIG. 3) may be placed between e.g. the photosensor 20 and the optical layer 30. Alternatively the adhesive layer may be placed between optical layer 30 and the scintillator 15. The adhesive layer may thus attach the photosensor 20 to the stack scintillator 15—optical coating layer 25 in the first case. Alternatively, the adhesive layer may attach the stack scintillator 15—optical coating layer 25 to the photsensor 20. The optical coating layer 25 reduces the sensitivity of the lateral spreading of the converted radiation CR caused by the variation of adhesive thickness. The radiation detectors 10, 12, 14 may be used in any manner suitable for the specific implementation.

Figure 4:
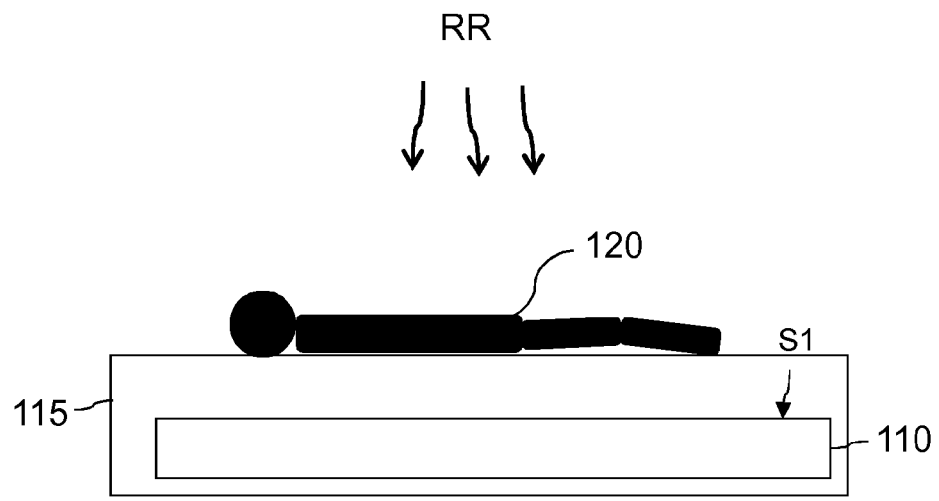
FIG. 4 shows an example of a radiological instrument.

For example, FIG. 4 shows an example of a radiological instrument 115 for radiographic imaging. The radiological instrument 115 comprises a flat panel detector 110. The flat panel detector 110 may comprise any of the radiation detectors 10, 12, or 14 shown in FIG. 1, 2 or 3, respectively.

The radiation detector may have a different shape than the flat shape shown in FIG. 4. The radiation detector may have for example a non-flat surface, for example a concave or convex surface. The incident radiation RR may be X-ray radiation from an X-ray radiation source (not shown in FIG. 4). The incident radiation RR penetrates a body of a patient 120 before impinging on the flat panel radiation detector 110 at the first side S1. The incident radiation RR is detected by the flat panel radiation detector 110 and converted into a radiographic image that may be used to diagnose a condition of the patient.

The radiological instrument 115 may be e.g. an intra-oral radiologic dental imager or a dental imager or a computed tomography scanner (CT-scanner) or a computed axial tomography scanners (CAT-scanners) or a mammography system or a mobile C-arm.

The radiation detectors 10, 12, 14 as described with reference to FIGS. 1, 2 and 3 may be fabricated with any suitable method of fabrication.

Figure 5:
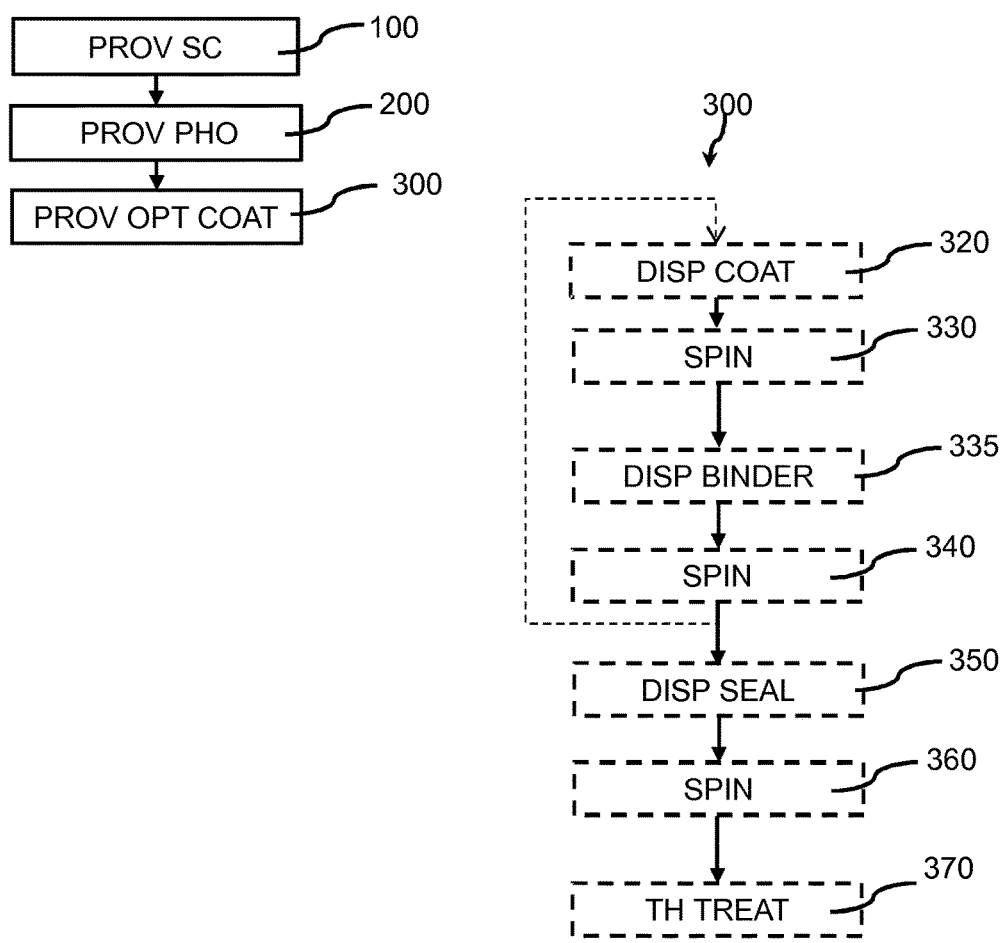
FIG. 5 shows a flow diagram of a method of manufacturing a radiation detector.

For example, FIG. 5 shows a flow diagram of a method of fabricating a radiation detector. The radiation detector detects incident radiation RR received at a first side of the radiation detector. With reference to the cross section of FIG. 1 and the flow diagram of FIG. 5, the method comprises:

providing 100 a scintillator 15 with a first refractive index $n_s$ such that the incident radiation RR is converted into converted radiation CR, providing 200 a photosensor 20 to receive the converted radiation CR from the scintillator 15.

Regions of the scintillator 15 are arranged for being imaged, when impinged by the incident radiation RR, onto corresponding regions of the photosensor 20. The method further comprises:

providing 300 an optical coating layer 25 arranged between the scintillator 15 and the photosensor 20.

The optical coating layer 25 has a second refractive index $n_o$. The second refractive index $n_o$ is lower than the first refractive index $n_s$ for substantially reflecting the converted radiation CR impinging on a particular region A1 of the scintillator 15 and received by a region A3 of the optical coating layer 25 corresponding to a region of the photosensor 20 different from the imaged region A2.

Providing 300 the optical coating layer 25 may be done in any way suitable for the specific implementation.

For example, providing 300 the optical coating layer 25 may comprise:

dispensing 320 a nano-porous coating material on a surface of the scintillator 15 or the photosensor 20 opposite to the first side S1, spinning 330 the scintillator 15 or the photosensor 20 such that the nano-porous material is conformally deposited on the surface.

A binder material may be optionally dispensed 335 and spinned 340 after the spinning 330.

The dispensing 320 and the spinning 330 and/or the dispensing 335 and the spinning 340 may be repeated one or more times to achieve a desired thickness d of the optical coating layer 25 and/or a desired thickness of the binder material.

A sealing layer may be optionally dispensed 350 and another spinning 360 step performed after the last spinning 340.

After spinning 360 the scintillator 15 or the photosensor 20, the structure obtained might be optionally subjected to a thermal treatment 370 (e.g. baking).

Alternatively, the optical coating layer 25 may be deposited on a surface of the scintillator 15 or photosensor 20 by dip coating (without spinning) with a subsequent evaporation of the solvent (with or without thermal treatment). A sealing layer may be optionally deposited.

The optical coating layer 25 may be directly deposited on a surface, e.g. the top surface, of the photosensor 20. Alternatively, as shown in FIG. 3, the optical coating layer 25 may be deposited directly on the optical layer 30. Alternatively, the optical coating layer 25 may be deposited on a surface, e.g. the bottom surface, of the scintillator 15. Either of the scintillator 15, photosensor 20 or optical layer 30 may be rotated to obtain a conformal deposition of the optical coating layer 25 on either of the respective surfaces.

The surface on which the optical coating layer 25 is deposited may be treated e.g. by ultraviolet-ozone treatment or by oxygen plasma treatment prior to the dispensing step to enhance adhesion properties and facilitate dispensing process. After providing 300 the optical coating layer 25, an adhesive layer may be provided to attach the optical stack including the optical coating layer 25 to the scintillator 15 or the photosensor 20.

The radiation detectors 10, 12 or 14 may be used to detect incident radiation RR at a first side S1 of the radiation detector 10 with a method of detecting the incident radiation RR including the following steps. In a first step the incident radiation RR is converted into converted radiation CR with a scintillator 15 having a first refractive index $n_s$. In a second step, an optical layer 25 having a second refractive index $n_o$ arranged between the scintillator 15 and a photosensor 20 arranged at a second side S2 opposite to the first side S1, totally reflects a portion of the converted radiation CR. In a third step the photosensor 20 receives the converted radiation CR from the scintillator 15 via the optical layer 25. Regions of the scintillator 15 on which the incident radiation RR impinges are intended to be imaged onto corresponding regions of the photosensor 20. The portion of the converted radiation CR that is reflected by the optical layer 25, is received by another region A3 of the optical layer 25 corresponding to a region of the photosensor 20 different from the region A2 onto which the region A1 of the scintillator 15 is intended to be imaged.

It should be noted that the above-mentioned embodiments illustrate rather than limit the invention, and that those skilled in the art will be able to design many alternative embodiments. For example it should be noted that the particular region A1, A4 of the scintillators 15 and 17, the corresponding imaged region A2, A5 of the photosensors 20 and 22 and the regions A3 and A6 of the optical coating layer 25 and 27 are merely illustrative example regions used to explain the effect reached by the solution provided in the present invention. This effect is clearly not limited to these specific regions but to any other regions of the scintillator 15 or 17, the photosensor 20 or 22 and the optical layer 25 and 27 with equivalent properties.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of fabricating a radiation detector for detecting incident radiation received at a first side of the radiation detector, the method comprising:

providing a scintillator with a first refractive index for converting the incident radiation into converted radiation;

providing a photosensor for receiving the converted radiation from the scintillator, regions of the scintillator on which the incident radiation impinges are arranged for being imaged onto corresponding regions of the photosensor; and providing an optical coating layer with a second refractive index between the scintillator and the photosensor, the second refractive index being lower than the first refractive index for substantially reflecting the converted radiation resulting from the incident radiation impinging on a particular one of the regions of the scintillator and received by a region of the optical coating layer corresponding to a region of the photosensor different from the imaged one, wherein providing the optical coating layer comprises:
   dispensing a nano-porous coating material on a surface of the scintillator; and
   spinning the scintillator such that the nano-porous coating material is conformally dispensed on the surface; and,
   after spinning to conformally dispense the nano-porous coating material on the surface of the scintillator,
   dispensing a binder material; and
   spinning the scintillator with the binder material on the nano-porous coating material.

2. The method of claim 1, further comprising, after spinning the scintillator with the binder material on the nano-porous coating material:
   dispensing a sealing layer on the nano-porous coating material; and
   spinning the scintillator.

3. A method of fabricating a radiation detector for detecting incident radiation received at a first side of the radiation detector, the method comprising:
   providing a scintillator with a first refractive index for converting the incident radiation into converted radiation;
   providing a photosensor for receiving the converted radiation from the scintillator, regions of the scintillator on which the incident radiation impinges are arranged for being imaged onto corresponding regions of the photosensor; and
   providing an optical coating layer with a second refractive index between the scintillator and the photosensor, the second refractive index being lower than the first refractive index for substantially reflecting the converted radiation resulting from the incident radiation impinging on a particular one of the regions of the scintillator and received by a region of the optical coating layer corresponding to a region of the photosensor different from the imaged one;

wherein providing the optical coating layer comprises:
   dispensing a nano-porous coating material on a surface of the photosensor; and
   spinning the photosensor such that the nano-porous coating material is conformally dispensed on the surface; and
   after spinning to conformally dispense the nano-porous coating material on the surface of the photosensor,
   dispensing a binder material; and
   spinning the photosensor with the binder material on the nano-porous coating material.

4. The method of claim 3, further comprising, after spinning the photosensor with the binder material on the nano-porous coating material:
   dispensing a sealing layer on the nano-porous coating material; and
   spinning the photosensor.

\* \* \* \* \*